(12) United States Patent
Ho et al.

(10) Patent No.: US 9,531,832 B2
(45) Date of Patent: *Dec. 27, 2016

(54) MIGRATING SOCIAL CONNECTIONS FROM A FIRST PROFILE TO A SECOND PROFILE

(71) Applicant: Google Inc., Mountain View, CA (US)

(72) Inventors: Ronald Ho, Fremont, CA (US); Justin Sadowski, San Francisco, CA (US); Amit Behal, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,719

(22) Filed: Jun. 6, 2014

(65) Prior Publication Data

US 2014/0289336 A1    Sep. 25, 2014

Related U.S. Application Data

(63) Continuation of application No. 13/457,046, filed on Apr. 26, 2012, now Pat. No. 8,782,153.

(51) Int. Cl.
*H04L 29/08* (2006.01)
*G06Q 10/10* (2012.01)
*G06Q 50/00* (2012.01)

(52) U.S. Cl.
CPC ............ *H04L 67/306* (2013.01); *G06Q 10/10* (2013.01); *G06Q 50/01* (2013.01)

(58) Field of Classification Search
CPC ........ H04L 67/306; G06Q 10/10; G06Q 50/01
USPC ................ 709/204, 206, 207, 217, 219, 227
See application file for complete search history.

(56) References Cited

U.S. PATENT DOCUMENTS

| | | |
|---|---|---|
| 8,418,067 B2 | 4/2013 | Cheng et al. |
| 2009/0171964 A1 | 7/2009 | Eberstadt |
| 2011/0060797 A1 | 3/2011 | Balandin et al. |
| 2011/0219050 A1* | 9/2011 | Ly et al. ........................ 707/827 |
| 2011/0302099 A1* | 12/2011 | Jeffries .................. G06Q 10/10 705/319 |
| 2012/0109830 A1 | 5/2012 | Vogel |

OTHER PUBLICATIONS

International Search Report and Written Opinion for PCT Application No. PCT/US2013/038397, mailed Oct. 8, 2013 (9 pages).

* cited by examiner

*Primary Examiner* — Viet Vu
(74) *Attorney, Agent, or Firm* — Patent Law Works LLP (57) ABSTRACT

In general, aspects of the present disclosure are directed to techniques for migrating social networking connections in a social network from one profile to another profile. A first incoming connection from a third profile in a social network to a first profile in the social network may be determined. A first outgoing connection to a fourth profile in the social network from the first profile in the social network may be determined. A second incoming connection from the third profile to a second profile may be created based at least in part on the first incoming connection. A second outgoing connection to the fourth profile from the second profile may be created based at least in part on the first outgoing connection.

21 Claims, 6 Drawing Sheets

MIGRATING SOCIAL CONNECTIONS FROM A FIRST PROFILE TO A SECOND PROFILE

CROSS-REFERENCE TO RELATED APPLICATIONS

This application is a continuation of U.S. patent application Ser. No. 13/457,046, now U.S. Publication No. 8,782,153 B2, entitled "Social Connections Migration" filed Apr. 26, 2012, the entire contents of each of which are incorporated herein by reference.

TECHNICAL FIELD

The disclosure relates to social network services, and more particularly relates to migrating social connections in a social network service.

BACKGROUND

In social networks, user profiles may form social connections with other user profiles. The social connections may include outgoing connections from a profile, in which the profile may link to, subscribe to, or follow an external profile. For example, the profile may follow the other profile to view information (e.g., updates, photos, etc.) the other profile makes available for viewing to the profile. The social connections may also include incoming connections into the profile, so that an external profile may link to, subscribe to, or follow the profile. For example, the external profile may follow the profile to view information the profile makes available for viewing to the external profile.

SUMMARY

In one aspect, the disclosure is directed to a method for migrating social networking connections in a social network. The method may include determining, using the one or more computing devices, a first incoming connection from a third profile in a social network to a first profile in the social network. The method may further include determining, using the one or more computing devices, a first outgoing connection to a fourth profile in the social network from the first profile in the social network. The method may further include creating, using the one or more computing devices, based at least in part on the first incoming connection, a second incoming connection from the third profile to a second profile. The method may further include creating, using the one or more computing devices, based at least in part on the first outgoing connection, a second outgoing connection to the fourth profile from the second profile.

In another aspect, the disclosure is directed to a server device including one or more computing devices. The one or more computing devices may be configured to perform a method including determining a first incoming connection from a third profile in a social network to a first profile in the social network. The method may further include determining a first outgoing connection to a fourth profile in the social network from the first profile in the social network. The method may further include creating, based at least in part on the first incoming connection, a second incoming connection from the third profile to a second profile. The method may further include creating, based at least in part on the first outgoing connection, a second outgoing connection to the fourth profile from the second profile.

In another aspect, the disclosure is directed to a computer-readable medium containing instructions. The instructions, when executed on at least one processor, cause the at least one processor to perform operations. The operations may include determining a first incoming connection from a third profile in a social network to a first profile in the social network. The operations may further include determining a first outgoing connection to a fourth profile in the social network from the first profile in the social network. The operations may further include creating, based at least in part on the first incoming connection, a second incoming connection from the third profile to a second profile. The operations may further include creating, based at least in part on the first outgoing connection, a second outgoing connection to the fourth profile from the second profile.

BRIEF DESCRIPTION OF DRAWINGS

The details of one or more aspects of the disclosure are set forth in the accompanying drawings and the description below. Other features, objects, and advantages of the disclosure will be apparent from the description and drawings, and from the claims.

DETAILED DESCRIPTION

Overview

In general, aspects of the present disclosure are directed to techniques for migrating social networking connections in a social network from one profile to another profile, so that a user may switch from an old profile to a new profile in the social network while being able to maintain the social connections the user had previously established with the old profile.

In some examples, a user of a profile in a social network may create a new profile in the social network and may switch to using the newly created profile as the user's main profile in the social network. For example, a user of a profile associated with the user's school may wish to migrate to another profile not associated with the user's school after the user graduates from school. However, in creating and switching to the new profile, there may be no easy way to transfer the social connections made by the user in the older profile to the newly created profile. Instead, it may be necessary for users of external profiles socially connected with the older profile to seek out the newly created profile and to manually connect the external profiles with the newly created profile.

According to some aspects of the present disclosure, a social network may be able to transfer the social connections of a first profile associated with a user to a second profile associated with the user without intervention by users associated with profiles that are socially connected to the first profile. For example, a third profile that was socially connected to the first profile because the third profile followed the first profile may automatically be socially connected to the second profile, so that the third profile now follows the second profile.

Transferring the social connections of the first profile to the second profile may include transferring both incoming and outgoing social connections of the first profile to the second profile. In some examples, the first profile may keep track of its outgoing social connections but may not keep track of incoming social connections to the first profile because it may typically be unnecessary for the first profile to track which other profiles are following the first profile. Instead, the social network may keep an index that indicates the incoming social connections of each user profile in the social network. Because the index may be updated relatively infrequently, incoming social connections to the first profile may have formed since the index was last updated. Therefore, after discovering the incoming social connections to the second profile based on the index, each profile listed in the index as having an outgoing social connection to the first profile may be queried to determine if the first profile does indeed have an incoming social connection from that profile. After the transfer of the social connections from the first profile to the second profile, a cleanup process may migrate any remaining social connections of the first profile to the second profile.

Example Social Network

Figure 1:
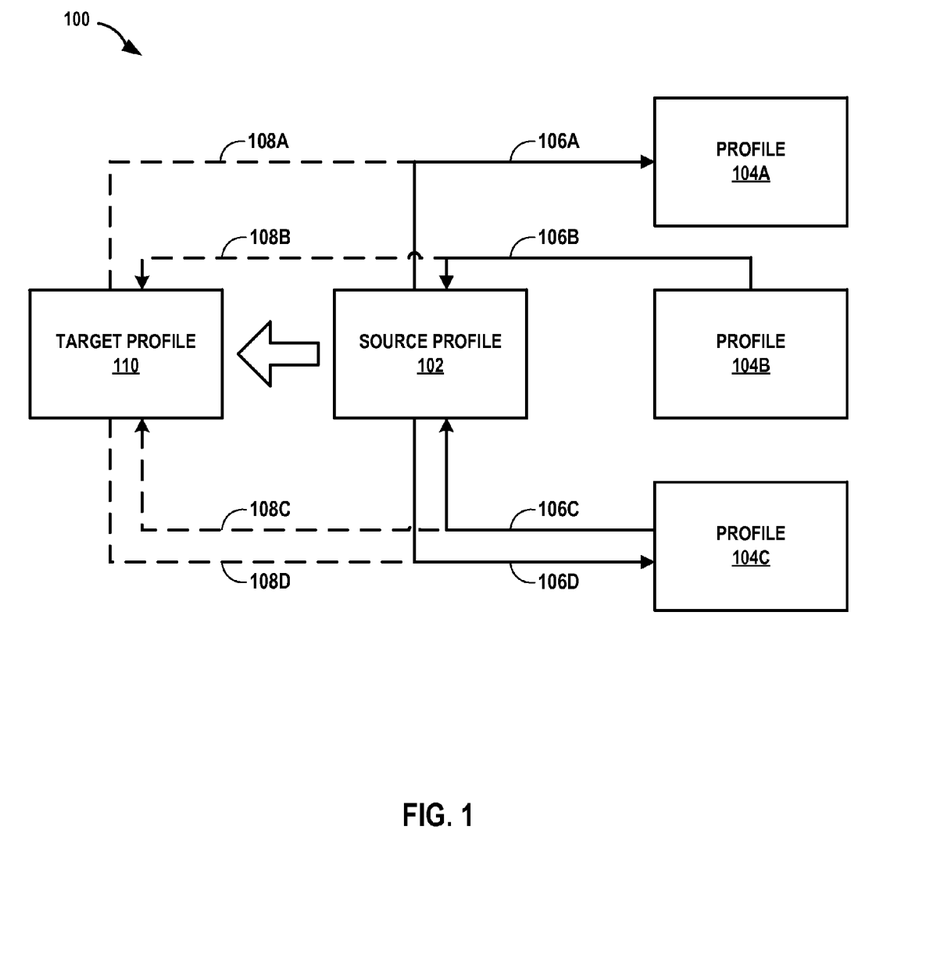
FIG. 1 is a block diagram illustrating an example user profile that transfers its example connections to another example user profile in an example social network according to some aspects of the present disclosure.

FIG. 1 is a block diagram illustrating an example user profile that migrates its example connections to another example user profile in an example social network according to some aspects of the present disclosure. As shown in FIG. 1, social networking service 100 may include source profile 102, target profile 110, profile 104A, profile 104B, and profile 104C, and may further include connections 106A-106D.

Social networking service 100 may be an online service, site, or platform that enables users of the service to form social connections. An example of a social networking service may include Google+. Social networking service 100 may include profiles, such as source profile 102, target profile 110, profile 104A, profile 104B, and profile 104C, which may serve as representations of the users of social networking service 100. Examples of profiles may include Google+ profiles. Relationships of the profiles in social networking service 100 may be denoted by connections 106A-106D that connects profiles in social networking service 100. The profiles in social networking service 100 may be connected to each other so that users of profiles that are connected may share status updates, pictures, videos, and other information with each other.

Connections between profiles in social networking service 100 may be directed, so that a connection may be outgoing from one profile it is directed away from and incoming into another profile that it is directed into. For example, connection 106A between source profile 102 and profile 104A may be considered an outgoing connection from the point of view of source profile 102 because it is directed away from source profile 102, and may be considered an incoming connection from the point of view of profile 104A because it is directed into profile 104A. As shown in FIG. 1, source profile 102's connections may include outgoing connections 106A and 106D to profile 104A and profile 104C, respectively, and may include incoming connections 106B and 106C from profile 104B and profile 104C, respectively.

Profile 104B and profile 104C may be considered followers of source profile 102 because source profile 102 has incoming connections 106B and 106C from each of profile 104B and profile 104C. Source profile 102 may also be considered a follower of profile 104A and profile 104C because source profile 102 has outgoing connections 106A and 106D to both profile 104A and profile 104C. Profiles in social networking service 100 may be able to share select status updates, photos, videos, and other information with followers. Thus, source profile 102 may be able to share status updates, photos, videos, and other information with followers such as profile 104B and profile 104C, and source profile 102 may be able to view status updates, photos, videos, and other information shared by profile 104A and profile 104C because source profile 102 follows profile 104A and profile 104C.

In some examples, source profile 102 and target profile 110 may be owned by or otherwise associated with a single user, and that user may be able to migrate the connections formed by source profile 102 to target profile 110, so that target profile 110 may have the same connections as source profile 102 after completion of the migration. Migrating the connections of source profile 102 to target profile 110 may include the user of source profile 102 sending an indication to social network 100 to create the target profile 110. Upon creation, target profile 110 may initially include no connections to other profiles in social network 100. The user of source profile 102 and target profile 110 may send an indication to social network 100 to migrate the connections of source profile 102 to target profile 110. The user may be authenticated, such as by requiring the user to enter passwords for source profile 102 and/or target profile 110, or by sending a security code via text message to a mobile phone that must be entered by the user, to determine if the user owns both source profile 102 and target profile 110. For example, the user may be required to enter the names and birth dates associated with both source profile 102 and target profile 110. In some examples, source profile 102 and target profile 110 may be required to be associated with the same phone number, and the user may be authenticated via text message to the phone number associated with both source profile 102 and target profile 110. In some examples, a combination of authentication techniques, including a combination of the authentication techniques described above, may be used to authenticate the user. Upon successful authentication of the user, the connections of source profile 102 may be migrated to target profile 110. In some examples, migrating the connections of source profile 102 may include sending notifications to followers of source profile 102 to notify the followers that source profile 102 has migrated to target profile 110.

Migrating the connections of source profile 102 to target profile 110 may further include determining connections of origination profile 102, and may include creating new connections for target profile 110 based at least in part on the connections of source profile 102. For example, outgoing connection 106A, incoming connection 106B, incoming connection 106C, and outgoing connection 106D may be determined as the connections of source profile 102. After the determination of the connections of source profile 102, outgoing connection 108A from target profile 110 to profile 104A may be created based at least in part on outgoing connection 106A from source profile 102 to profile 104A. Incoming connection 108B to target profile 110 from profile 104B may be created based at least in part on incoming connection 106B to source profile 102 from profile 104B. Incoming connection 108C to target profile 110 from profile 104C may be created based at least in part on incoming connection 106C to source profile 102 from profile 104C. Outgoing connection 108D from target profile 110 to profile 104D may be created based at least in part on outgoing connection 106D from source profile 102 to profile 104D.

Because profile 104B and profile 104C are followers of source profile 102, profile 104B and profile 104C may also be followers of target profile 110 after the migration, so that profile 104B and profile 104C may be able to view information shared by profile 110. Similarly, because source profile 102 followed profile 104A and profile 104C before the migration, target profile 110 may follow profile 104A and profile 104C after the migration, so that target profile 110 may be able to view information shared by profile 104A and profile 104C.

In some examples, the migration of connections of source profile 102 to target profile 110 may be performed without intervention by users of profiles connected to source profile 102, such as users of profile 104A, profile 104B, and profile 104C, so that the migration process may be transparent to the users of those profiles. In some examples, an alert may be sent to the profiles connected to source profile 102 to indicate that target profile 110 is attempting to connect to those profiles. In some examples, it may be necessary for the users of those profiles to confirm the new connections before those profiles are connected to target profile 110. In some examples, an alert regarding new connections to target profile 110 may be sent to users of profiles that follow source profile 102, but the alert may not be sent to users of profiles that are connected to but do not follow profile 102.

In some examples, source profile 102 may organize, group or categorize the profiles it is connected to. Therefore, in some examples, the migration of connections of source profile 102 to target profile 110 may include migrating the organization of connected profiles by source profile 102. For example, source profile 102 may have categorized profile 104A as being a member of a "family" group because the user of profile 104A is related to the user of source profile 102. Source profile 102 may also have categorized profile 104C as being a member of an "acquaintances" group because the user of profile 104C is an acquaintance of the user of source profile 102. Therefore, migrating connections of source profile 102 to target profile 110 may, in some examples, include transferring the organization of socially connected profiles from source profile 102 to target profile 110, including creating "family" and "acquaintances" groups in target profile 110 and populating the "family" group with profile 104A and the "acquaintances" group with 104C, so that profile 104A may be categorized as being a member of a "family" group and profile 104C may be categorized as being a member of an "acquaintances" group in target profile 110.

In some examples, migrating connections of source profile 102 to target profile 110 may include preserving the connections of source profile 102, so that the connections of source profile 102 are not deleted during the migration. In some examples, outgoing connections of source profile 102, such as connection 106A and connection 106D, may be preserved, but incoming connections into source profile 102, such as connection 106B and connection 106C, may be deleted during the migration, to prevent profiles that follow target profile 110 to receive duplicate information shared by both target profile 110 and source profile 102. In some examples, all of the connections of source profile 102 may be deleted after successful migration of the connections to target profile 110.

In some examples, the deletion of a connection from a profile to the source profile 102 may be performed in the same transaction as the creation of a new connection from the same profile to the target profile 110, where a transaction may be defined as a set of operations that either all succeed or all fail. By performing the deletion and the creation in a single transaction, the chance of duplicate or lost connections caused by the migration may be decreased.

In some examples, profiles may restrict communications to other profiles, such as by blocking or ignoring other profiles. Blocking a profile may include denying the blocked profile access to view the blocking profile' contents. Ignoring a profile may include ignoring mentions and/or notifications from the ignored profiles. Source profile 102 may include an indication of one or more profiles connected to source profile 102 that are ignored or blocked by source profile 102. Source profile 102 may also include an indication of one or more profiles connected to source profile 102 that are blocking or ignoring source profile 102.

In some examples, the indication of one or more profiles connected to source profile 102 that are ignored or blocked by source profile 102 as well as the indication of one or more profiles connected to source profile 102 that are blocking or ignoring source profile 102 may be migrated to target profile 110. For example, if source profile 102 blocked profile 104C prior to migrating the connections of source profile 102 to target profile 110, an indication of profile 104C being blocked may be migrated to target profile 110, so that target profile 110 may also include an indication that target profile 110 is blocking profile 104C.

In some examples, indications of blocked and/or ignored profiles may be migrated from source profile 102 to target profile 110 before migrating the connections of source profile 102 to target profile 110. If the indications of blocked and/or ignored profiles are migrated after the connections of source profile 102 to target profile 110, then profiles blocked from source profile 102 may be able to access content in target profile 110 in the time between the migration of the connections of source profile 102 to target profile 110 and the migration of indications of blocked and/or ignored profiles to target profile 110.

In some examples, there may be a quota or limit as to the number of profiles a profile may block. For example, profile 104A may block source profile 102 and profile 104A may be at its limit for the number of blocks. As discussed above, if source profile 102 is migrated to target profile 110, profile 104A may also now block target profile 110 in addition to source profile 102. However, if profile 104A is at its limit for the number of blocks before attempting to block target profile 110, profile 104A may be unable to block target profile 110. Therefore, migrating indications of blocked and/or ignored profiles from source profile 102 to target profile 110 may include raising the quota or limit of blocks for profiles that block source profile 102 if blocking target profile 110 without raising the quota or limit of blocks would put those profiles over the quota or limit for the number of blocks.

In some examples, an incoming connection to a target profile may not be able to be deleted if the source profile where the incoming connection originates is restricting communications with the target profile, such as by blocking or ignoring the target profile. Thus, for example, if profile 104B restricts communications with source profile 102, such as by blocking or ignoring source profile 102, then incoming connection 106B to source profile 102 may not be able to be deleted as part of the profile migration process.

Migrating the connections of source profile 102 may include determining the incoming and outgoing connections of source profile 102. In some examples, source profile 102 may include information regarding its connections and the profiles to which the connections connect. Therefore, determining the connections of source profile 102 may include querying source profile 102. However, in some examples, source profile 102 may include information regarding only outgoing connections of source profile 102, but may not include information regarding incoming connections. Rather, social network 100 may maintain a reverse index that tracks incoming connections for each profile in social network 100. Thus, the reverse index may be queried to look up incoming connections to source profile 102, and the reverse index may indicate that source profile 102 has incoming connections 106B and 106C from profiles 104B and 104C, respectively.

Although reverse index may track incoming connections for each profile in social network 100, the reverse index may, in some examples, may not be frequently updated. For example, the reverse index may only be updated once an hour, or once a day. Therefore, each profile indicated in the reverse index as having a connection into source profile 102 may be queried to determine if the connections of each of those profiles include a current connection from those profiles into source profile 102, and connections from those profiles into target profile 110 may be created if the connections of those profiles do include a current connection from those profiles into source profile 102.

After the migration process, a cleanup process may re-check source profile 102 to determine whether any additional connections of source profile 102 were missed and not yet transferred to target profile 110 by the migration process. For example, additional connections of source profile 102 may be formed after the start of the migration process. Social network 100 may keep track of additional connections of source profile 102 formed after the start of the migration process, and the cleanup process may transfer those additional connections of origination profile 102 to target profile 110 using similar techniques as described above.

The cleanup process may also check on the status of the migration process to determine if it is necessary to retry the migration of any connections of source profile 102 to target profile 110. For example, if the migration of a connection of source profile 102 has not completed after a specified amount of time has elapsed since the start of the migration process, the cleanup process may retry the migration of the connection of source profile 102.

Example System

Figure 2:
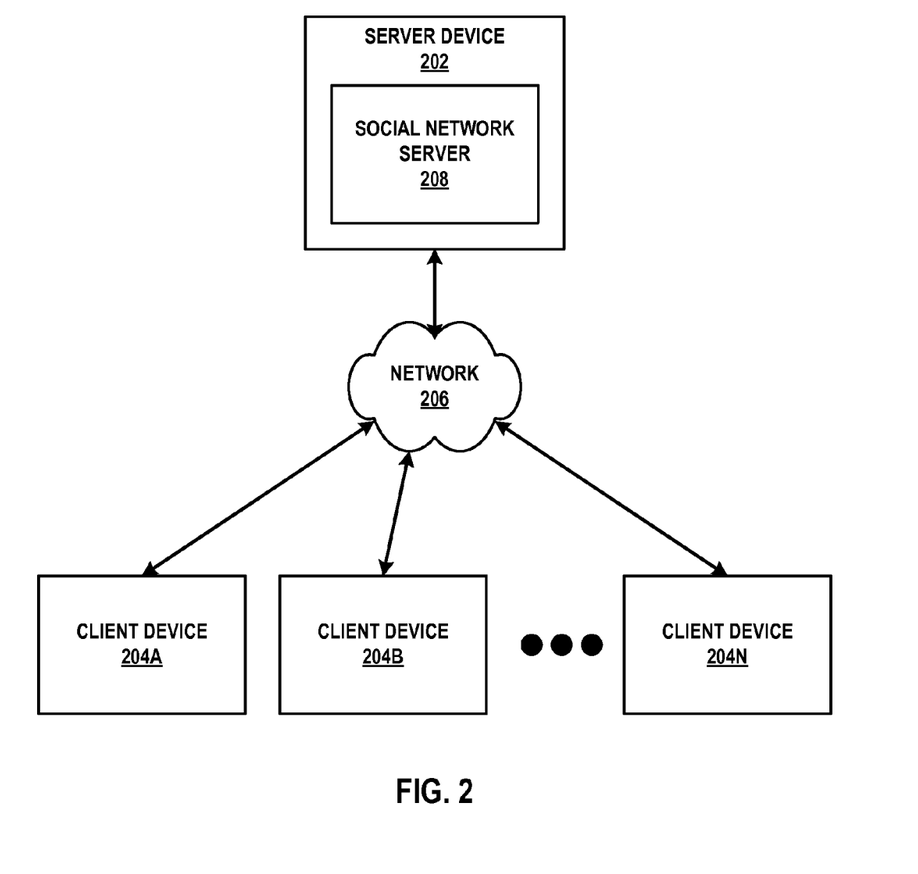
FIG. 2 is a block diagram illustrating an example server device that communicates with example client devices via an example network according to some aspects of the present disclosure.

FIG. 2 is a block diagram illustrating an example server device that communicates with example client devices via an example network according to some aspects of the present disclosure. As shown in FIG. 2, server device 202 may communicate with client devices 204A-204N ("client devices 204") via network 206. Client devices may be computing devices, such as but not limited to desktop computers, mobile phones (including smart phones), laptop computers, personal digital assistants (PDAs), portable gaming devices, portable media players, and e-book readers, as well as desktop computers, set top boxes, gaming systems, televisions with one or more processors embedded therein or coupled thereto, and the like, including a combination of two or more of these items.

Server device 202 may include one or more computing devices, and may also include social network server 208, which may provide a social networking service, such as social networking service 100 shown in FIG. 1. Users may access the social networking service provided by social network server 208, including sending an indication to social network server 208 to migrate connections of a first profile to a second profile in social network server 208, via client devices 204. For example, social network server 208 may include a web server, and client devices 204 may each include a web browser that may communicate with the web server included in social network server 208 to access the social network service provided by social network server 208.

Example Device

Figure 3:
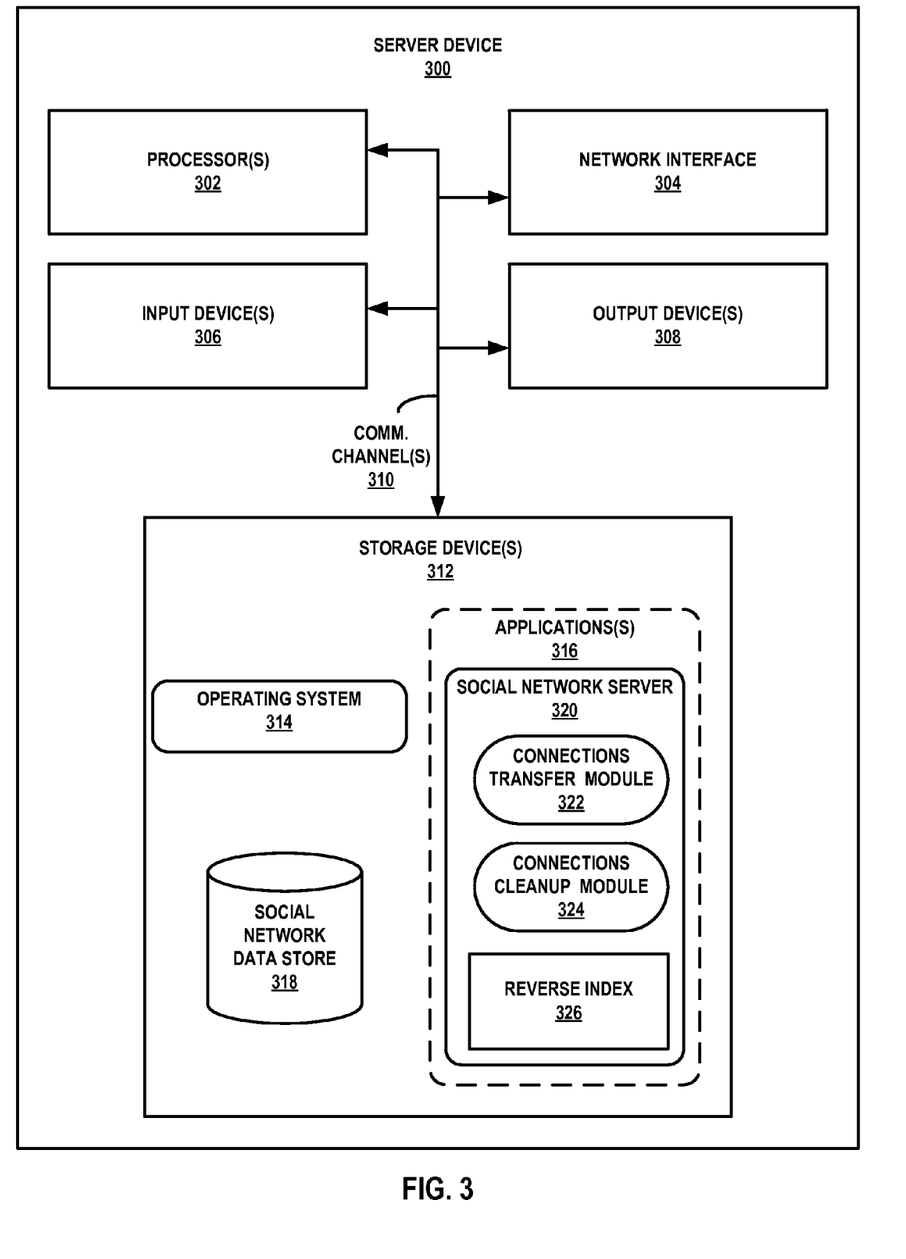
FIG. 3 is a block diagram illustrating details of an example server device according to some aspects of the present disclosure.

FIG. 3 is a block diagram illustrating an example server device, such as server device 202 shown in FIG. 2, according to some aspects of the present disclosure. FIG. 3 illustrates only one particular example of server device 300, and many other example embodiments of server device 300 may be used in other instances.

As shown in the specific example of FIG. 3, server device 300 may include one or more processors 302, network interface 304, one or more storage devices 312, one or more input devices 306, and one or more output devices 308. Server device may also include operating system 314 that is executable by server device 300. Server device 300, in one example, further includes social network server 320 that is also executable by server device 300. Each of components 302, 304, 306, 308, and 312, may be interconnected (physically, communicatively, and/or operatively) by communication channels 310 for inter-component communications.

One or more processors 302, in one example, may be configured to implement functionality and/or process instructions for execution within server device 300. For example, one or more processors 302 may be capable of processing instructions stored on one or more storage devices 312.

Server device 300, in some examples, may also include network interface 304. Server device 300, in one example, may use network interface 304 to communicate with external devices via one or more networks, such as one or more wireless networks. Network interface 304 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server device 300 utilizes network interface 304 to wirelessly communicate with an external device such as one or more of client devices 204 shown in FIG. 2.

Server device 300, in one example, may also include one or more input devices 306. One or more input devices 306, in some examples, may be configured to receive input from a user through tactile, audio, or video feedback. Examples of one or more input devices 306 may include a presence-sensitive screen, a mouse, a keyboard, a voice responsive system, video camera, microphone or any other type of device for detecting a command from a user.

One or more output devices 308 may also be included in server device 300. One or more output devices 308, in some examples, may be configured to provide output to a user using tactile, audio, or video stimuli. One or more output devices 308, in one example, may include a presence-sensitive screen, a sound card, a video graphics adapter card, or any other type of device for converting a signal into an appropriate form understandable to humans or machines. Additional examples of one or more output devices 308 may include a speaker, a cathode ray tube (CRT) monitor, a liquid crystal display (LCD), or any other type of device that can generate intelligible output to a user.

In some examples, server device 300 may include one or more storage devices 312. One or more storage devices 312, in some examples, may include one or more computer-readable storage media. One or more storage devices 312 may further be configured for long-term storage of information. In some examples, one or more storage devices 312 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In some examples, one or more storage devices 312 may also include memory. Memory may be described as a computer-readable storage medium. In some examples, memory may be a temporary memory, meaning that a primary purpose of memory is not long-term storage. Memory, in some examples, may be described as a volatile memory, meaning that memory does not maintain stored contents when the computer is turned off. Examples of volatile memories may include random access memories (RAM), dynamic random access memories (DRAM), static random access memories (SRAM), and other forms of volatile memories known in the art. In some examples, memory may be used to store program instructions for execution by one or more processors 302. Memory, in one example, may be used by software or applications running on server device 300 (e.g., one or more applications 316) to temporarily store information during program execution.

Server device 300 may include operating system 314. Operating system 314, in some examples, may control the operation of components of server device 300. For example, operating system 314 may facilitate the interaction of one or more applications 316 (e.g., social network server 320) with one or more processors 302, network interface 304, one or more storage devices 312, one or more input devices 306, and one or more output devices 308.

As shown in FIG. 3, server device 300 may include social network server 320 and social network data store 318. Social network server 320 may include connections transfer module 322, connections cleanup module 324, and reverse index 326. One or more applications 316, social network server 320, connections transfer module 322, connections cleanup module 324, and reverse index 326 may each include program instructions and/or data that are executable by server device 300. For example, connections transfer module 322 and connections cleanup module 324 may include instructions that cause server device 300 to perform one or more of the operations and actions described in the present disclosure. Although not shown, each of components 310, 314, 316, and 300, may be interconnected (physically, communicatively, and/or operatively) by communication channels for inter-component communications.

According to some aspects of the present disclosure, social network server 320 may be configured to provide a social networking service, such as social networking service 100 shown in FIG. 1. Social network server 320 may further be configured to communicate, via network interface 304, with external devices. For example, social network server 320 may receive, via network interface 304 from an external device, an indication to migrate the connections of a first profile to a second profile in the social network service provided by social network server 320.

According to some aspects of the present disclosure, connections transfer module 322 may be configured to migrate the connections of a first profile to a second profile in the social network service provided by social network server 320. Connections transfer module 322 may retrieve information regarding the first profile, including outgoing connections of the first profile, from social network data store 318, and may create outgoing connections for the second profile that are directed to the same profiles as the outgoing connections of the first profile. Connections transfer module 322 may also query reverse index 326 for an indication of social profiles in the social networking service having outgoing connections into the first profile. Connections transfer module 322 may subsequently retrieve information from social network data store 318 regarding each profile indicated by reverse index 326 as having an outgoing connection to the first profile, and may query each of those profiles to determine whether the profiles are connected into the first profile. After determining the incoming connections of the first profile, connections transfer module 322 may create incoming connections for the second profile that are directed from the same profiles as the incoming connections of the first profile.

According to some aspects of the present disclosure, connections cleanup module 324 may be configured to clean up any connections of the first profile that might not have been migrated to the second profile by connections transfer module 322. For example, after the start of the migration process of connections transfer module 322, additional profiles may form connections to the first profile. Social network server 320 may keep track of the additional connections formed with the first profile after the start of the migration process, and connections cleanup module 324 may migrate those additional profiles to the second profile. Connections cleanup module 324 may also determine if any connections of the first profile have not completed migration to the second profile, and may retry the migration of those profiles with uncompleted migrations from the first profile to the second profile.

Example Operation

Figure 4:
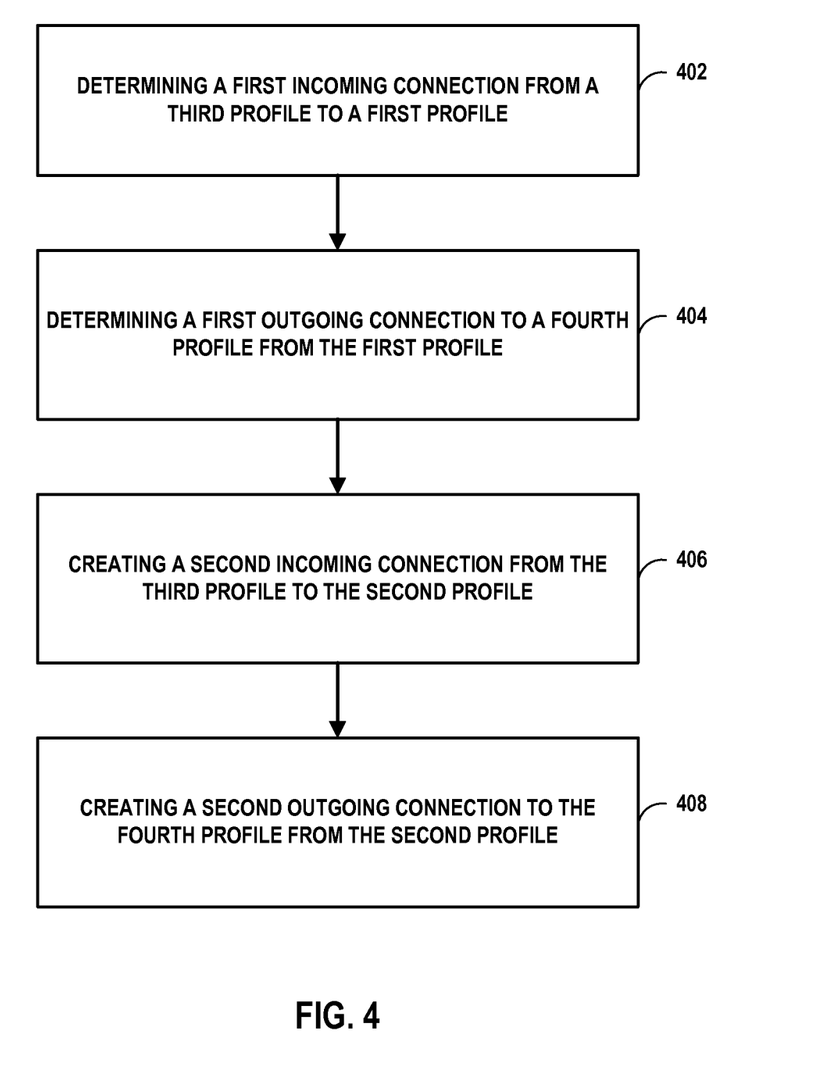
FIG. 4 is a flow diagram illustrating an example operation of a method for migrating social networking connections in a social network according to some aspects of the present disclosure.

FIG. 4 is a flow diagram illustrating an example operation of a method for migrating social networking connections in a social network. As shown in FIG. 4, the method may include determining, using one or more computing devices, a first incoming connection from a third profile in a social network to a first profile in the social network (402). For example, connections transfer module 322 of social network server 320 in FIG. 3 may be configured determine one or more incoming connections to the first profile in the social network, such as determining incoming connections 106B and 106C to source profile 102 in social network 100 shown in FIG. 1.

The method may further include determining, using the one or more computing devices, a first outgoing connection to a fourth profile in the social network from the first profile in the social network (404). For example, referring to FIG. 3 as a part of block 404, connections transfer module 322 of social network server 320 may further be configured to determine one or more outgoing connections from the first profile in the social network, such as determining outgoing connections 106A and 106D from source profile 102 in social network 100 shown in FIG. 1.

The method may further include creating, using the one or more computing devices, based at least in part on the first incoming connection, a second incoming connection from the third profile to a second profile (406). For example, referring to FIG. 3 as a part of block 406, connections transfer module 322 of social network server 320 may further be configured to create one or more incoming connections to the first profile in the social network, such as creating incoming connections 108B and 108C to target profile 110 in FIG. 1.

The method may further include creating, using the one or more computing devices, based at least in part on the first outgoing connection, a second outgoing connection to the fourth profile from the second profile (408). For example, referring to FIG. 3 as a part of block 408, connections transfer module 322 of social network server 320 may further be configured to create one or more outgoing connections from the second profile in the social network, such as creating outgoing connections 108A and 108D from target profile 110 in FIG. 1.

In some examples, the first outgoing connection to the fourth profile in the social network from the first profile in the social network may enable the first profile to view information shared by the fourth profile, and the first incoming connection from the third profile in the social network to the first profile in the social network may enable the third profile to view information shared by the first network. In some examples, the second incoming connection may be created without intervention by a user of the third profile. In some examples, the second outgoing connection may be created without intervention by a user of the fourth profile.

In some examples, the method may further include assigning the fourth profile to a category in the second profile, wherein the fourth profile also belongs to a same category in the first profile. In some examples, a single user may be authorized to access the first profile and the second profile. In some examples, the method may further include authenticating the single user. In some examples, the method may further include creating the second profile, wherein the second profile has no connections upon creation.

In some examples, creating the second incoming connection from the third profile to the second profile includes querying an index to look up incoming connections to the first profile. In some examples, creating the second incoming connection from the third profile to the second profile further includes, if the index indicates that the third profile includes the first incoming connection from the third profile to the first profile, querying the third profile to determine if the connections of the third profile include the first incoming connection from the third profile to the first profile, and creating the second incoming connection from the third profile to the second profile if the third profile indicates that the connections of the third profile include the first incoming connection from the third profile to the first profile.

In some examples, the method may further include, after creating the second incoming connection from the third profile to the second profile, determining if connections of the first profile include additional incoming connections not yet transferred to the second profile, and creating incoming connections to the second profile based at least in part on the additional incoming connections. In some examples, determining if connections of the first profile include additional incoming connections not yet transferred to the second profile further includes, after creating the second incoming connection from the third profile to the second profile, determining if one or more profiles have added an incoming connection from the one or more profiles to the first profile after creating the second incoming connection from the third profile to the second profile has started.

In some examples, the method may further include deleting the first incoming connection from the first profile after creating the second incoming connection. In some examples, deleting the first incoming connection and creating the second incoming connection are performed as a single transaction. In some examples, the method may further include disallowing deletion of the first incoming connection from the third profile to the first profile based on one or more settings of the third profile. In some examples, the method may further include alerting the third profile that the second profile is attempting to connect to the third profile.

Example Interface

FIG. 5A-5D are conceptual diagrams illustrating an example graphical user interface (GUI) for migrating social networking connections from one example profile to another example profile according to some aspects of the present disclosure. The example GUI may be provided by a server device, such as server device 202 shown in FIG. 2 or server device 300 shown in FIG. 3, and may be displayed at a client device, such as one of client devices 204 shown in FIG. 2. A user may transfer social connections from a first profile to a second profile using the example GUI.

Figure 5A:
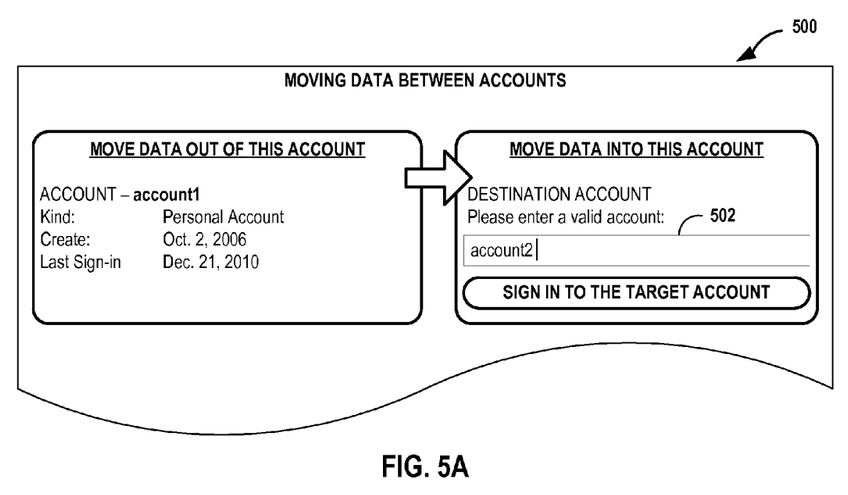
FIG. 5A-5D are conceptual diagrams illustrating an example graphical user interface for migrating social networking connections from one example profile to another example profile according to some aspects of the present disclosure.
Figure 5B:
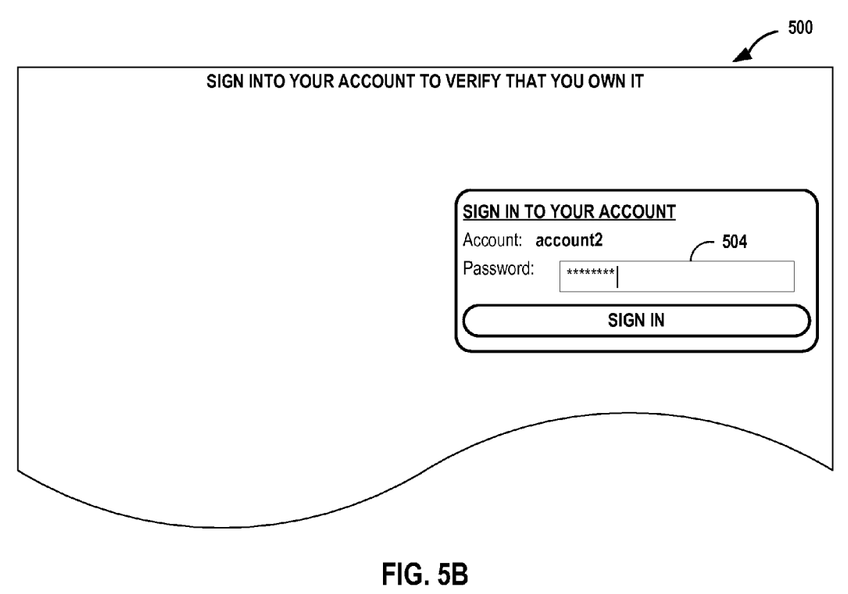

As shown in FIG. 5A, GUI 500 may provide a user interface for a user to specify a destination profile to which the user would like to transfer the connections of a originating profile. The user has already successfully logged into profile "account1", and the user may specify the profile to which the user would like to transfer the connections of profile "account1" by inputting the name of the destination profile (such as "account2") into field 502. As shown in FIG. 5B, GUI 500 may provide a user interface for the user to be authenticated as the owner of profile "account2". For example, GUI 500 may include input field 504, and the user may input a password for profile "account2" into input field 504.

Figure 5C:
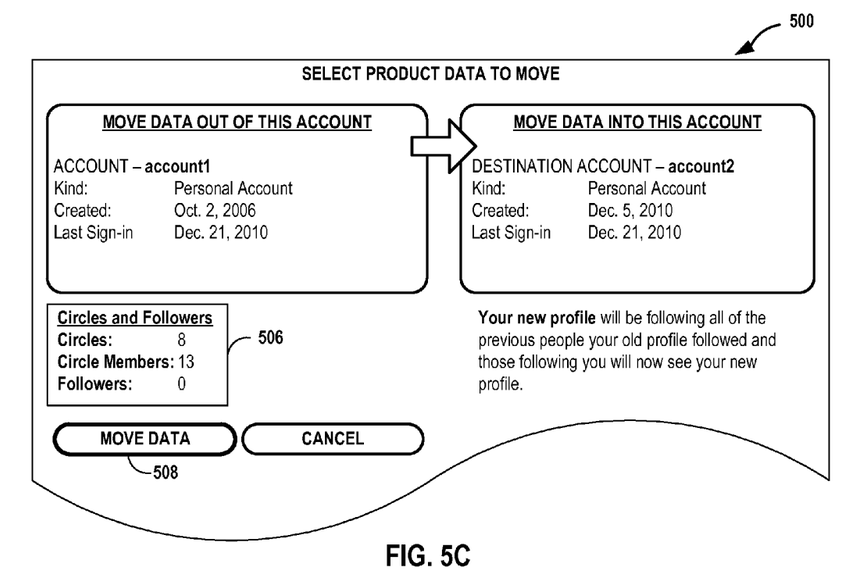
Figure 5D:
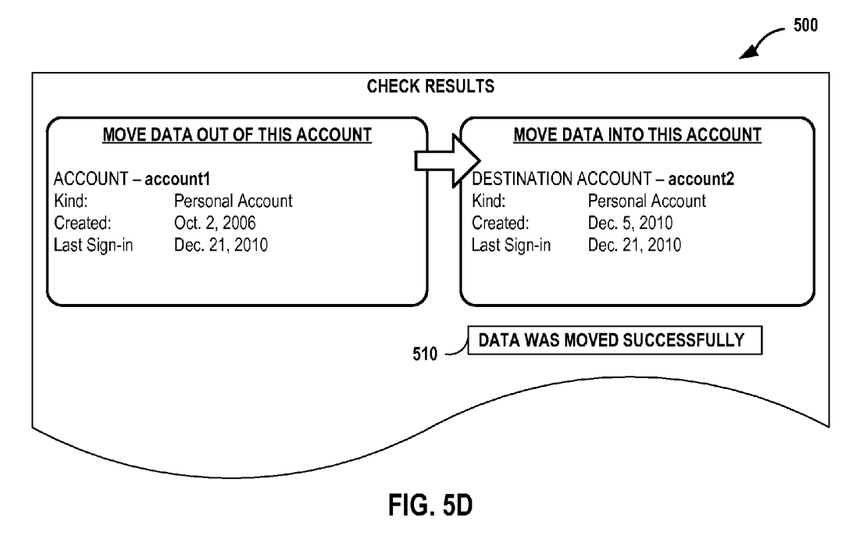

As shown in FIG. 5C, after successful authentication of the user, GUI 500 may provide a user interface for the user to migrate the connections of an originating profile "account1" to destination profile "account2". GUI 500 may display an indication 506 of the connections to be migrated to profile "account2". GUI 500 may also include a GUI control, such as a "move data" button 508 that may be selected by the user to commence migration of the connections from profile "account1" to profile "account 2". As shown in FIG. 5D, GUI 500 may provide a confirmation 510 that the connections were successfully migrated from profile "account1" to profile "account2".

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various aspects of the disclosure have been described. These and other aspects are within the scope of the following claims.

The invention claimed is:

1. A computer-implemented method comprising:
    receiving, using one or more computing devices, a request to create a new profile for a user in a social network;
    determining, using the one or more computing devices, connections of an existing profile of the user in the social network, the connections connecting the existing profile with other profiles in the social network;
    creating, using the one or more computing devices, the new profile for the user;
    receiving, using the one or more computing devices, a request to migrate the connections of the existing profile of the user to the new profile of the user, the existing profile of the user including an indication of restricted communication between the existing profile and a subset of the connections;
    transferring, using the one or more computing devices, the connections of the existing profile of the user to the new profile of the user, the new profile of the user including the indication of restricted communication between the existing profile and the subset of the connections of the existing profile;
    determining, using the one or more computing devices, whether an additional connection is formed with the existing profile of the user; and
    in response to determining that the additional connection was formed, migrating using the one or more computing devices, the additional connection to the new profile of the user.

2. The computer-implemented method of claim 1, wherein transferring the connections of the existing profile includes transferring one or more of incoming connections to the existing profile from various profiles in the social network and outgoing connections from the existing profile to various profiles in the social network.

3. The computer-implemented method of claim 1, wherein transferring the connections of the existing profile occurs without intervention by users associated with the other profiles.

4. The computer-implemented method of claim 1, wherein
    the connections of the existing profile include an incoming connection from a third profile in the social network to the existing profile and an outgoing connection from the existing profile to a fourth profile in the social network, and
    transferring the connections of the existing profile includes creating an incoming connection from the third profile to the new profile based on the incoming connection from the third profile to the existing profile and creating an outgoing connection from the new profile to the fourth profile in the social network based on the outgoing connection from the existing profile to the fourth profile.

5. The computer-implemented method of claim 4, further comprising:
    determining, using the one or more computing devices, groups categorizing one or more relationships between the existing profile and one or more of the other profiles connected to the existing profile in the social network, the groups including a first group that a third profile belongs to and a second group that a fourth profile belongs to; and
    creating, using the one or more computing devices, a corresponding first group and a corresponding second group for the new profile based on the first group and the second group of the existing profile.

6. The computer-implemented method of claim 1, further comprising:
    determining, using the one or more computing devices, an indication of a communication restriction between the existing profile and a third profile to exist, wherein transferring the connections includes creating a corresponding indication for a communication restriction between the new profile and the third profile.

7. The computer-implemented method of claim 1, further comprising:
    assigning, using the one or more computing devices, a fourth profile associated with the new profile to a category, wherein the fourth profile belongs to a same category in the existing profile.

8. A computer program product comprising a non-transitory computer-readable medium storing a computer-readable program, wherein the computer-readable program, when executed on one or more computers, causes the one or more computers to perform operations comprising:

receiving, using one or more computing devices, a request to create a new profile for a user in a social network;

determining, using the one or more computing devices, connections of an existing profile of the user in the social network, the connections connecting the existing profile with other profiles in the social network;

creating, using the one or more computing devices, the new profile for the user;

receiving, using the one or more computing devices, a request to migrate the connections of the existing profile of the user to the new profile of the user, the existing profile of the user including an indication of restricted communication between the existing profile and a subset of the connections;

transferring, using the one or more computing devices, the connections of the existing profile of the user to the new profile of the user, the new profile of the user including the indication of restricted communication between the existing profile and the subset of the connections of the existing profile;

determining, using the one or more computing devices, whether an additional connection is formed with the existing profile of the user; and in response to determining that the additional connection was formed, migrating using the one or more computing devices, the additional connection to the new profile of the user.

9. The computer program product of claim 8, wherein transferring the connections of the existing profile includes transferring one or more of incoming connections to the existing profile from various profiles in the social network and outgoing connections from the existing profile to various profiles in the social network.

10. The computer program product of claim 8, wherein transferring the connections of the existing profile occurs without intervention by users associated with the other profiles.

11. The computer program product of claim 8, wherein
the connections of the existing profile include an incoming connection from a third profile in the social network to the existing profile and an outgoing connection from the existing profile to a fourth profile in the social network, and transferring the connections of the existing profile includes creating an incoming connection from the third profile to the new profile based on the incoming connection from the third profile to the existing profile and creating an outgoing connection from the new profile to the fourth profile in the social network based on the outgoing connection from the existing profile to the fourth profile.

12. The computer program product of claim 11, wherein the computer-readable program, when executed on one or more computers, further causes the one or more computers to perform operations of:

determining groups categorizing one or more relationships between the existing profile and one or more of the other profiles connected to the existing profile in the social network, the groups including a first group that a third profile belongs to and a second group that a fourth profile belongs to; and creating a corresponding first group and a corresponding second group for the new profile based on the first group and the second group of the existing profile.

13. The computer program product of claim 8, wherein the computer-readable program, when executed on the one or more computers, further causes the one or more computers to perform operations of:

determining an indication of a communication restriction between the existing profile and a third profile to exist, wherein transferring the connections includes creating a corresponding indication for a communication restriction between the new profile and the third profile.

14. The computer program product of claim 8, wherein the computer-readable program, when executed on the one or more computers, further causes the one or more computers to perform operations of:

assigning a fourth profile associated with the new profile to a category, wherein the fourth profile belongs to a same category in the existing profile.

15. A system comprising:

one or more processors; and one or more memories storing instructions that, when executed by the one or more processors, cause the system to perform operations including:

receiving, using one or more computing devices, a request to create a new profile for a user in a social network;

determining, using the one or more computing devices, connections of an existing profile of the user in the social network, the connections connecting the existing profile with other profiles in the social network;

creating, using the one or more computing devices, the new profile for the user;

receiving, using the one or more computing devices, a request to migrate the connections of the existing profile of the user to the new profile of the user, the existing profile of the user including an indication of restricted communication between the existing profile and a subset of the connections;

transferring, using the one or more computing devices, the connections of the existing profile of the user to the new profile of the user, the new profile of the user including the indication of restricted communication between the existing profile and the subset of the connections of the existing profile;

determining, using the one or more computing devices, whether an additional connection is formed with the existing profile of the user; and in response to determining that the additional connection was formed, migrating using the one or more computing devices, the additional connection to the new profile of the user.

16. The system of claim 15, wherein transferring the connections of the existing profile includes transferring one or more of incoming connections to the existing profile from various profiles in the social network and outgoing connections from the existing profile to various profiles in the social network.

17. The system of claim 15, wherein transferring the connections of the existing profile occurs without intervention by users associated with the other profiles.

18. The system of claim 15, wherein
the connections of the existing profile include an incoming connection from a third profile in the social network to the existing profile and an outgoing connection from the existing profile to a fourth profile in the social network, and transferring the connections of the existing profile includes creating an incoming connection from the third profile to the new profile based on the incoming connection from the third profile to the existing profile and creating an outgoing connection from the new profile to the fourth profile in the social network based on the outgoing connection from the existing profile to the fourth profile.

19. The system of claim 18, wherein the instructions, when executed by the one or more processors, further causes the system to perform operations including:
   determining groups categorizing one or more relationships between the existing profile and one or more of the other profiles connected to the existing profile in the social network, the groups including a first group that a third profile belongs to and a second group that a fourth profile belongs to; and
   creating a corresponding first group and a corresponding second group for the new profile based on the first group and the second group of the existing profile.

20. The system of claim 15, wherein the instructions, when executed by the one or more processors, further causes the system to perform operations including:
   determining an indication of a communication restriction between the existing profile and a third profile to exist, wherein transferring the connections includes creating a corresponding indication for a communication restriction between the new profile and the third profile.

21. The system of claim 15, wherein the instructions, when executed by the one or more processors, further causes the system to perform operations including:
   assigning a fourth profile associated with the new profile to a category, wherein the fourth profile belongs to a same category in the existing profile.

\* \* \* \* \*

UNITED STATES PATENT AND TRADEMARK OFFICE
CERTIFICATE OF CORRECTION

| | | |
|---|---|---|
| PATENT NO. | : 9,531,832 B2 | Page 1 of 1 |
| APPLICATION NO. | : 14/298719 | |
| DATED | : December 27, 2016 | |
| INVENTOR(S) | : Ronald Ho, Justin Sadowski and Amit Behal | |

It is certified that error appears in the above-identified patent and that said Letters Patent is hereby corrected as shown below:

In the Specification

In Column 6, Line 17, please replace "profile" with --profile's--

In Column 10, Line 56, after configured, please insert --to--

Signed and Sealed this
Fourth Day of April, 2017

Michelle K. Lee
*Director of the United States Patent and Trademark Office*